J. L. FIRM.
RESILIENT WHEEL.
APPLICATION FILED JULY 29, 1914.
1,143,180.
Patented June 15, 1915.
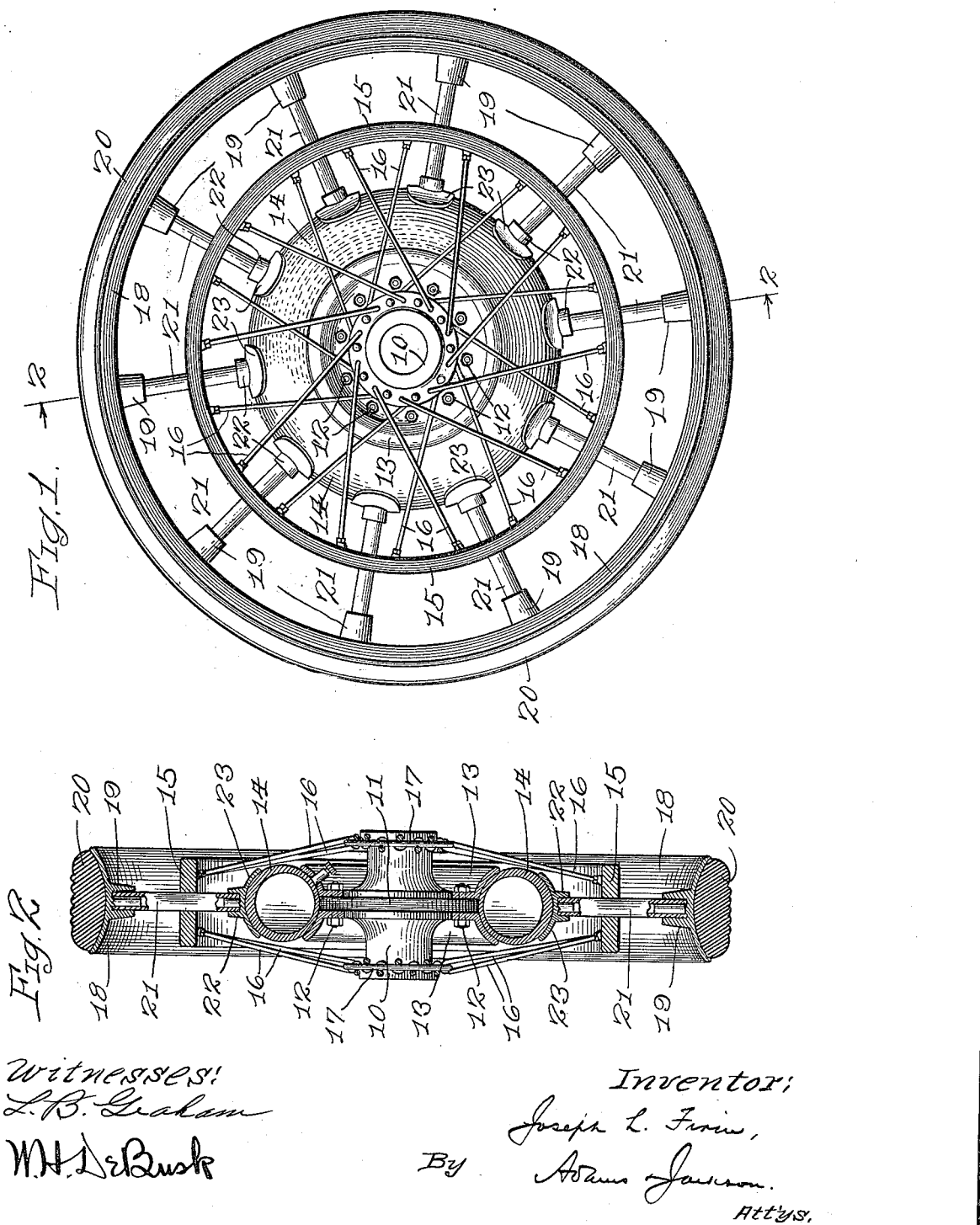

UNITED STATES PATENT OFFICE.

JOSEPH L. FIRM, OF BERWYN, ILLINOIS.

RESILIENT WHEEL.

1,143,180.  Specification of Letters Patent.  Patented June 15, 1915.

Application filed July 29, 1914. Serial No. 853,819.

*To all whom it may concern:*

Be it known that I, JOSEPH L. FIRM, a citizen of the United States, residing at Berwyn, in the county of Cook and State of Illinois, have invented certain new and useful Improvements in Resilient Wheels, of which the following is a specification, reference being had to the accompanying drawings.

This invention relates to resilient wheels, and it has for one of its objects the provision of a new and improved construction and arrangement by which the resilience of a pneumatic tube mounted on the wheel within a flexible outer rim is transmitted to such outer rim.

It is another object of my invention to improve devices of this general type in sundry details hereinafter pointed out.

The means by which I have accomplished my objects are illustrated in the accompanying drawings and are hereinafter specifically described. That which I believe to be new is set forth in the claim.

In the drawings,—Figure 1 is a side view of a wheel embodying my improvements; and Fig. 2 is a cross-section through the wheel, taken substantially on line 2—2 of Fig. 1.

Referring to the several figures of the drawings, in which corresponding parts are indicated by the same reference characters,—10 indicates a hub-member provided with a central flange 11 to which are secured by means of bolts 12 angle-irons 13 which together form a rim for a pneumatic tire 14. Spaced away from the rim 13 and the tube 14 is an annular band 15 secured in position by means of spokes 16 extending from the band 15 to flanges 17 carried by the hub, the spokes 16 being positioned on opposite sides of the tube 14.

18 indicates a flexible outer rim of the wheel, in the construction shown being formed of a thin sheet of steel with bosses 19 secured thereon. Mounted upon the outer face of the rim 18 and secured thereon in any well known manner is a solid rubber tire 20 of any approved type. The rim 18 and the tire 20 are secured in position relative to the pneumatic tube 14 by means of spokes 21 having their outer ends mounted in the bosses 19 and their inner ends mounted in bosses 22 formed upon shoes 23 which bear upon the pneumatic tube 14, the spokes 21 passing through suitable bearings in the band 15 and adapted to slide longitudinally of themselves therethrough.

With the parts in position as shown and described and the pneumatic tube 14 inflated to a comparatively high pressure, the parts will be held against displacement, as will be readily understood.

In operation, with a load supported from the hub of the wheel, on account of the flexibility of the rim 18 and the solid tire 20, the rim is adapted to yield readily to inequalities of the ground, just as the pneumatic tube 14 would yield if the tube itself were resting upon the ground. The advantages of a pneumatic tire are thus attained while at the same time danger of punctures and blow-outs and the objectionable contact of the pneumatic tube with the hot roadway are avoided.

While I have shown and described the rim 18 as being made, in the construction shown, of a thin sheet of metal, it will be understood that I do not wish to limit myself in this respect except as hereinafter specifically claimed, it being understood that the rim may be made of any suitable sheet material whereby it is given the requisite flexibility to yield readily and the required strength to hold up under the pressure which is brought to bear upon the wheel.

That which I claim as my invention, and desire to secure by Letters Patent, is,—

In a resilient wheel; a hub; a pneumatic tire carried on the hub; a guiding band spaced about the tire; spokes securing the guiding band to the hub and arranged at the opposite sides of the tire and out of contact therewith; a plurality of pins mounted on the guiding band independent of and between the spokes and engaging at their inner ends with said pneumatic tire; and an outer rim supported upon the outer ends of said pins.

JOSEPH L. FIRM.

Witnesses:
W. H. DE BUSK,
MINNIE A. HUNTER.

Copies of this patent may be obtained for five cents each, by addressing the "Commissioner of Patents, Washington, D. C."